US012555890B2

(12) United States Patent
Lukic et al.

(10) Patent No.: US 12,555,890 B2
(45) Date of Patent: Feb. 17, 2026

(54) ANTENNA SYSTEM FOR AN ELECTRONIC DEVICE HAVING A METAL HOUSING

(71) Applicant: GoPro, Inc., San Mateo, CA (US)

(72) Inventors: Milan Velimir Lukic, San Mateo, CA (US); Roger Allen Bremer, San Mateo, CA (US)

(73) Assignee: GoPro, Inc., San Mateo, CA (US)

(*) Notice: Subject to any disclaimer, the term of this patent is extended or adjusted under 35 U.S.C. 154(b) by 52 days.

(21) Appl. No.: 18/755,028

(22) Filed: Jun. 26, 2024

(65) Prior Publication Data

US 2026/0005424 A1 Jan. 1, 2026

(51) Int. Cl.
*H01Q 1/22* (2006.01)
*H01Q 5/335* (2015.01)
*H01Q 9/42* (2006.01)

(52) U.S. Cl.
CPC ............... *H01Q 1/22* (2013.01); *H01Q 5/335* (2015.01); *H01Q 9/42* (2013.01)

(58) Field of Classification Search
CPC .......... H01Q 1/22; H01Q 1/273; H01Q 5/335; H01Q 9/42
See application file for complete search history.

(56) References Cited

U.S. PATENT DOCUMENTS

2023/0114125 A1* 4/2023 Kenkel .................. H01Q 21/28
343/700 MS
2025/0141110 A1* 5/2025 Sampo ................... H01Q 21/28

FOREIGN PATENT DOCUMENTS

WO WO-2023053818 A1 * 4/2023 ........... H01Q 1/3291

* cited by examiner

*Primary Examiner* — Daniel Munoz
(74) *Attorney, Agent, or Firm* — Young Basile Hanlon & MacFarlane, P.C.

(57) ABSTRACT

An antenna system is configured for use with an electronic device having a housing. The antenna system includes a first antenna element configured to be disposed at a first location adjacent to a side of the housing and a second antenna element configured to be disposed at a second location adjacent to the side of the housing. The first antenna element includes a first body extending between a first lower end and a first upper end. The first body includes a first flat portion, a first arcuate portion, and a first cutout configured to facilitate dual-band radiation associated with the first antenna element. The second antenna element includes a second body extending between a second lower end and a second upper end. The second body includes a second flat portion, a second arcuate portion, and a second cutout configured to facilitate dual-band radiation associated with the second antenna element.

20 Claims, 12 Drawing Sheets

ANTENNA SYSTEM FOR AN ELECTRONIC DEVICE HAVING A METAL HOUSING

TECHNICAL FIELD

This disclosure relates to an antenna system, and more specifically, to an antenna assembly configured for use with an electronic device having a metal housing.

BACKGROUND

Electronic devices such as image capture apparatuses, recording devices, sampling devices, and/or other devices that can be carried and/or worn by a user often are manufactured according to a form factor. Some electronic devices have metal housings and small form factors that can make antenna placement challenging, particularly in the case of multiple input-multiple output (MIMO) antennas that rely on spatial diversity to maximize efficiency and throughput.

SUMMARY

Disclosed herein are implementations of an antenna system configured for use with an electronic device having a housing. The system includes a first antenna element configured to be disposed at a first location adjacent to a side of the housing. The first antenna element includes a first left edge extending along a first body between a first lower end and a first upper end, the first body comprising a first flat portion and a first arcuate portion, and a first right edge extending along the first body between the first lower end and the first upper end, and a first cutout configured to facilitate dual-band radiation associated with the first antenna element defined in the first left edge and extending from a front surface of the first body to a first rear surface of the first body. The system includes a second antenna element configured to be disposed at a second location adjacent to the side of the housing. At least a portion of the second antenna element is disposed adjacent to an additional side of the housing. The second antenna element includes a second left edge extending along a second body between a second lower end and a second upper end, the second body comprising a second flat portion and a second arcuate portion, a second right edge extending along the second body between the second upper end and a hook feature that protrudes from the second right edge, and a second cutout configured to facilitate dual-band radiation associated with the second antenna element defined in the second arcuate portion and extending from a second front surface of the second body to a second rear surface of the second body. The second cutout comprises a slot extending perpendicularly away from the second upper end toward the second lower end of the second body.

Disclosed herein are implementations of an electronic device having a metal housing and an antenna system. The antenna system includes a first antenna element configured to be disposed at a first location adjacent to a side of the metal housing. The first antenna element includes a first left edge extending along a first body between a first lower end and a first upper end, the first body comprising a first flat portion and a first arcuate portion, and a first right edge extending along the first body between the first lower end and the first upper end, and a first cutout configured to facilitate dual-band radiation associated with the first antenna element defined in the first left edge and extending from a front surface of the first body to a first rear surface of the first body. The system includes a second antenna element configured to be disposed at a second location adjacent to the side of the metal housing. At least a portion of the second antenna element is disposed adjacent to an additional side of the metal housing. The second antenna element includes a second left edge extending along a second body between a second lower end and a second upper end, the second body comprising a second flat portion and a second arcuate portion, a second right edge extending along the second body between the second upper end and a hook feature that protrudes from the second right edge, and a second cutout configured to facilitate dual-band radiation associated with the second antenna element defined in the second arcuate portion and extending from a second front surface of the second body to a second rear surface of the second body. The second cutout comprises a slot extending perpendicularly away from the second upper end toward the second lower end of the second body.

Disclosed herein are implementations of an antenna system for an image capture apparatus having a housing. The antenna system includes a first antenna element configured to be disposed at a first location adjacent to a side of the housing. The first antenna element includes a first left edge extending along a first body between a first lower end and a first upper end, the first body comprising a first flat portion and a first arcuate portion, and a first right edge extending along the first body between the first lower end and the first upper end, and a first cutout configured to facilitate dual-band radiation associated with the first antenna element defined in the first left edge and extending from a front surface of the first body to a first rear surface of the first body. The system includes a second antenna element configured to be disposed at a second location adjacent to the side of the housing. At least a portion of the second antenna element is disposed adjacent to an additional side of the housing. The second antenna element includes a second left edge extending along a second body between a second lower end and a second upper end, the second body comprising a second flat portion and a second arcuate portion, a second right edge extending along the second body between the second upper end and a hook feature that protrudes from the second right edge, and a second cutout configured to facilitate dual-band radiation associated with the second antenna element defined in the second arcuate portion and extending from a second front surface of the second body to a second rear surface of the second body. The second cutout comprises a slot extending perpendicularly away from the second upper end toward the second lower end of the second body.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Various implementations described herein include an antenna system for use with an electronic device having a metal housing. The antenna system may include a first antenna element configured to be disposed at a first location adjacent to a side of the housing and a second antenna element configured to be disposed at a second location adjacent to the side of the housing. At least a portion of the second antenna element may be disposed adjacent to an additional side of the housing. The first antenna element may include a first body extending between a first lower end and a first upper end. The first body may include a first flat portion and a first arcuate portion. The first antenna element also may include a first cutout configured to facilitate dual-band radiation associated with the first antenna element. The second antenna element may include a second body extending between a second lower end and a second upper end. The second body may include a second flat portion and a second arcuate portion. The second body also may include a second cutout configured to facilitate dual-band radiation associated with the second antenna element.

Figure 1A:
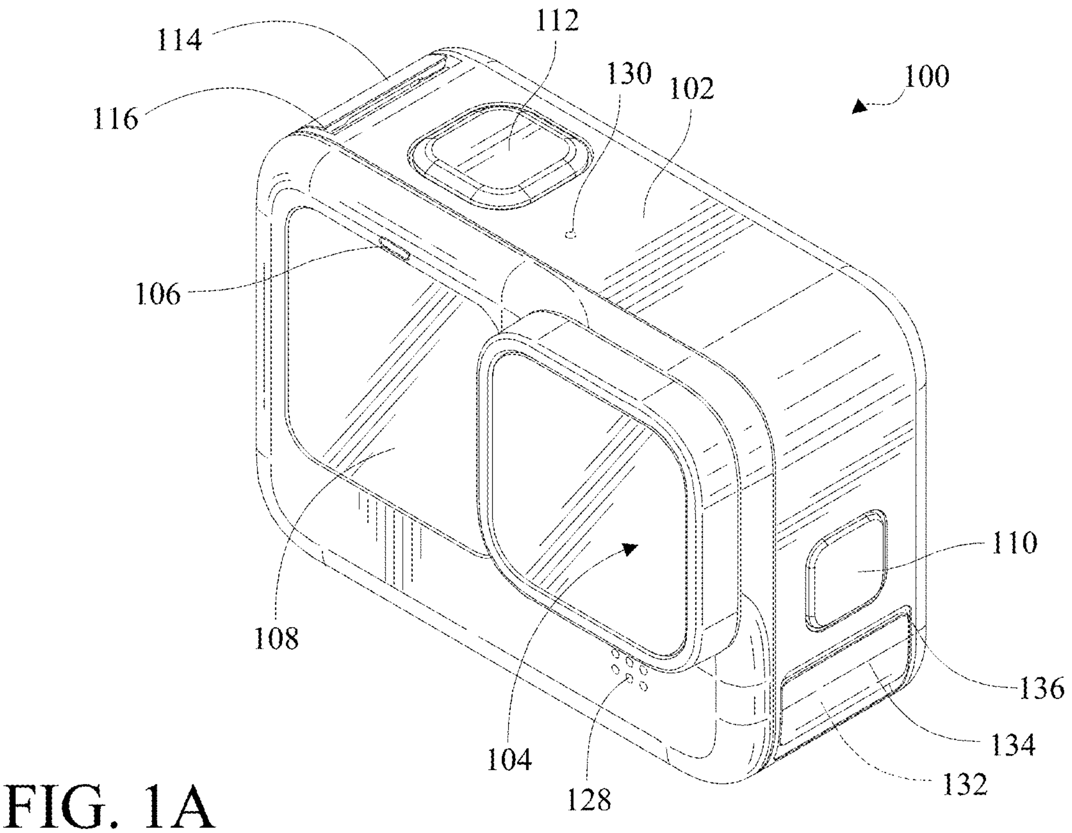
FIGS. 1A-1B are isometric views of an example of an image capture apparatus.
Figure 1B:
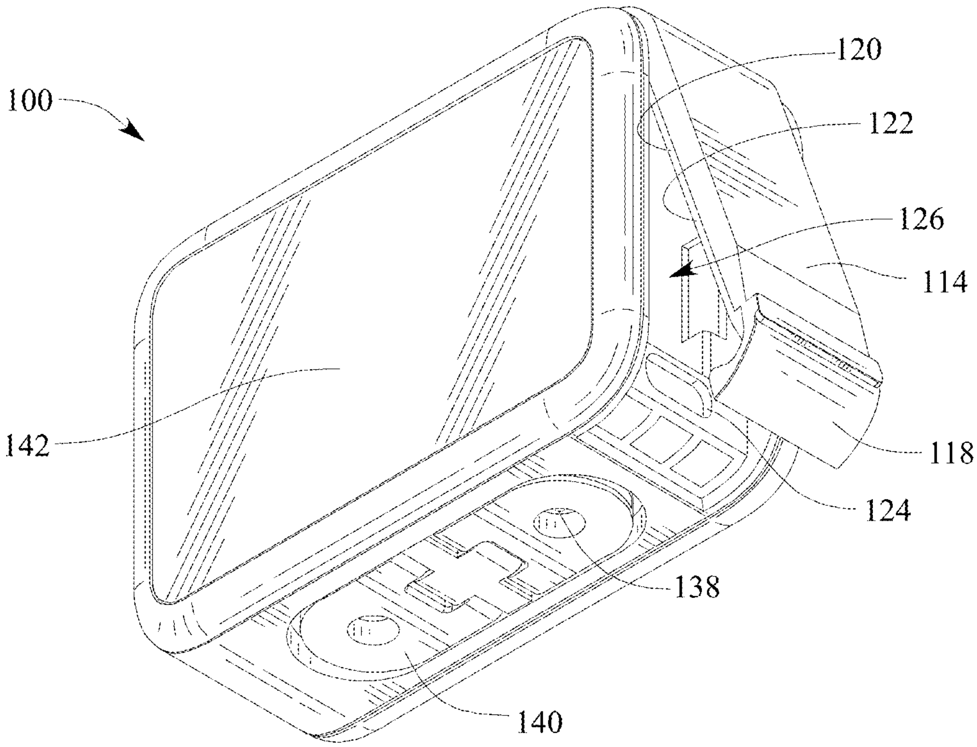

FIGS. 1A-1B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 138, an interconnect mechanism 140, and a display 142. Although not expressly shown in FIGS. 1A-1B, the image capture apparatus 100 includes internal electronics, such as imaging electronics, power electronics, and the like, internal to the body 102 for capturing images and performing other functions of the image capture apparatus 100. An example showing internal electronics is shown in FIG. 4. The arrangement of the components of the image capture apparatus 100 shown in FIGS. 1A-1B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used. The image capture device 104 is structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. In some implementations, the display 108 may be omitted or combined with another component of the image capture apparatus 100.

As shown in FIG. 1A, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1A, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. The shutter button 112 may be another type of input device, such as a switch, a toggle, a slider, or a dial. The image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1B, the image capture apparatus 100 includes the door 114 coupled to the body 102, such as using the hinge mechanism 116 (FIG. 1A). The door 114 may be secured to the body 102 using the latch mechanism 118 that releasably engages the body 102 at a position generally opposite the hinge mechanism 116. The door 114 includes the seal 120 and the battery interface 122. Although one door 114 is shown in FIG. 1A, the image capture apparatus 100 may include multiple doors respectively forming respective surfaces of the body 102, or portions thereof. The door 114 may be removable from the body 102 by releasing the latch mechanism 118 from the body 102 and decoupling the hinge mechanism 116 from the body 102.

In FIG. 1B, the door 114 is shown in a partially open position such that the data interface 124 is accessible for communicating with external devices and the battery receptacle 126 is accessible for placement or replacement of a battery. In FIG. 1A, the door 114 is shown in a closed position. In implementations in which the door 114 is in the closed position, the seal 120 engages a flange (not shown) to provide an environmental seal and the battery interface 122 engages the battery (not shown) to secure the battery in the battery receptacle 126.

As shown in FIG. 1B, the image capture apparatus 100 includes the battery receptacle 126 structured to form a portion of an interior surface of the body 102. The battery receptacle 126 includes operative connections for power transfer between the battery and the image capture apparatus 100. In some implementations, the battery receptacle 126 may be omitted. The image capture apparatus 100 may include multiple battery receptacles.

As shown in FIG. 1A, the image capture apparatus 100 includes a first microphone 128 structured on a front surface of the body 102, a second microphone 130 structured on a top surface of the body 102, and a third microphone 132 structured on a side surface of the body 102. The third microphone 132, which may be referred to as a drain microphone and is indicated as hidden in dotted line, is located behind a drain cover 134, surrounded by a drain channel 136, and can drain liquid from audio components of the image capture apparatus 100. The image capture apparatus 100 may include other microphones on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 138 structured on a bottom surface of the body 102. The speaker 138 outputs or presents audio, such as by playing back recorded audio or emitting sounds associated with notifications. The image capture apparatus 100 may include multiple speakers structured on respective surfaces of the body 102.

As shown in FIG. 1B, the image capture apparatus 100 includes the interconnect mechanism 140 structured on a bottom surface of the body 102. The interconnect mechanism 140 removably connects the image capture apparatus 100 to an external structure, such as a handle grip, another mount, or a securing device. The interconnect mechanism 140 includes folding protrusions configured to move between a nested or collapsed position as shown in FIG. 1B and an extended or open position. The folding protrusions of the interconnect mechanism 140 in the extended or open position may be coupled to reciprocal protrusions of other devices such as handle grips, mounts, clips, or like devices. The image capture apparatus 100 may include multiple interconnect mechanisms structured on, or forming a portion of, respective surfaces of the body 102. In some implementations, the interconnect mechanism 140 may be omitted.

As shown in FIG. 1B, the image capture apparatus 100 includes the display 142 structured on, and forming a portion of, a rear surface of the body 102. The display 142 outputs, such as presents or displays, such as by emitting visible light, data, such as to show image information such as image previews, live video capture, or status information such as battery life, camera mode, elapsed time, and the like. In some implementations, the display 142 may be an interactive display, which may receive, detect, or capture input, such as user input representing user interaction with the image capture apparatus 100. The image capture apparatus 100 may include multiple displays structured on respective surfaces of the body 102, such as the displays 108, 142 shown in FIGS. 1A-1B. In some implementations, the display 142 may be omitted or combined with another component of the image capture apparatus 100.

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100. For example, the image capture apparatus 100 may communicate with an external device, such as an external user interface device, via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link.

The external device may store, process, display, or combination thereof, the images. The external user interface device may be a computing device, such as a smartphone, a tablet computer, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
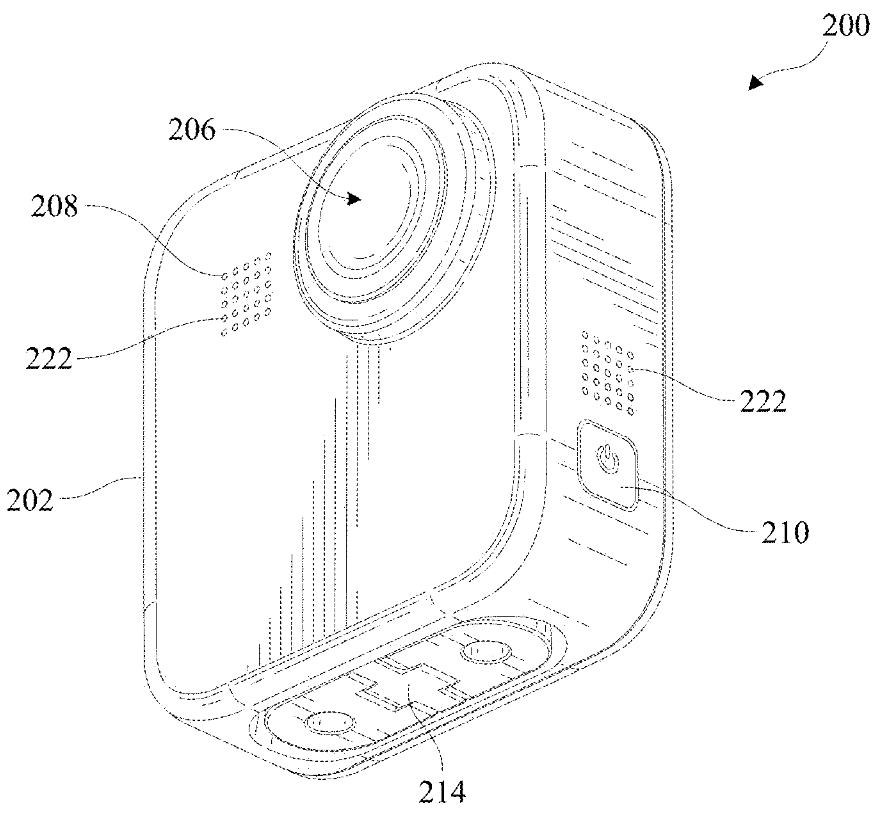
FIGS. 2A-2B are isometric views of another example of an image capture apparatus.
Figure 2B:
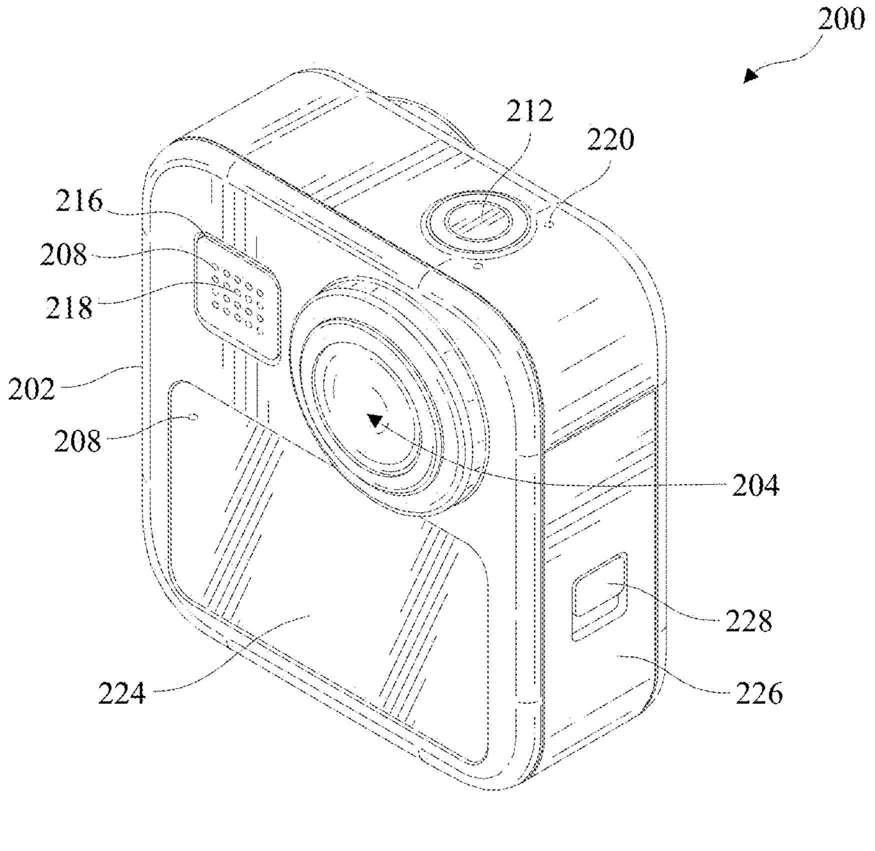

FIGS. 2A-2B illustrate another example of an image capture apparatus 200. The image capture apparatus 200 is similar to the image capture apparatus 100 shown in FIGS. 1A-1B. The image capture apparatus 200 includes a body 202, a first image capture device 204, a second image capture device 206, indicators 208, a mode button 210, a shutter button 212, an interconnect mechanism 214, a drainage channel 216, audio components 218, 220, 222, a display 224, and a door 226 including a release mechanism 228. The arrangement of the components of the image capture apparatus 200 shown in FIGS. 2A-2B is an example, other arrangements of elements may be used.

The body 202 of the image capture apparatus 200 may be similar to the body 102 shown in FIGS. 1A-1B. The first image capture device 204 is structured on a front surface of the body 202. The first image capture device 204 includes a first lens. The first image capture device 204 may be similar to the image capture device 104 shown in FIG. 1A. As shown in FIG. 2A, the image capture apparatus 200 includes the second image capture device 206 structured on a rear surface of the body 202. The second image capture device 206 includes a second lens. The second image capture device 206 may be similar to the image capture device 104 shown in FIG. 1A. The image capture devices 204, 206 are disposed on opposing surfaces of the body 202, for example, in a back-to-back configuration, Janus configuration, or offset Janus configuration. The image capture apparatus 200 may include other image capture devices structured on respective surfaces of the body 202.

As shown in FIG. 2B, the image capture apparatus 200 includes the indicators 208 associated with the audio component 218 and the display 224 on the front surface of the body 202. The indicators 208 may be similar to the indicator 106 shown in FIG. 1A. For example, one of the indicators 208 may indicate a status of the first image capture device 204 and another one of the indicators 208 may indicate a status of the second image capture device 206. Although two indicators 208 are shown in FIGS. 2A-2B, the image capture apparatus 200 may include other indictors structured on respective surfaces of the body 202.

As shown in FIGS. 2A-2B, the image capture apparatus 200 includes input mechanisms including the mode button 210, structured on a side surface of the body 202, and the shutter button 212, structured on a top surface of the body 202. The mode button 210 may be similar to the mode button 110 shown in FIG. 1B. The shutter button 212 may be similar to the shutter button 112 shown in FIG. 1A.

Figure 5:
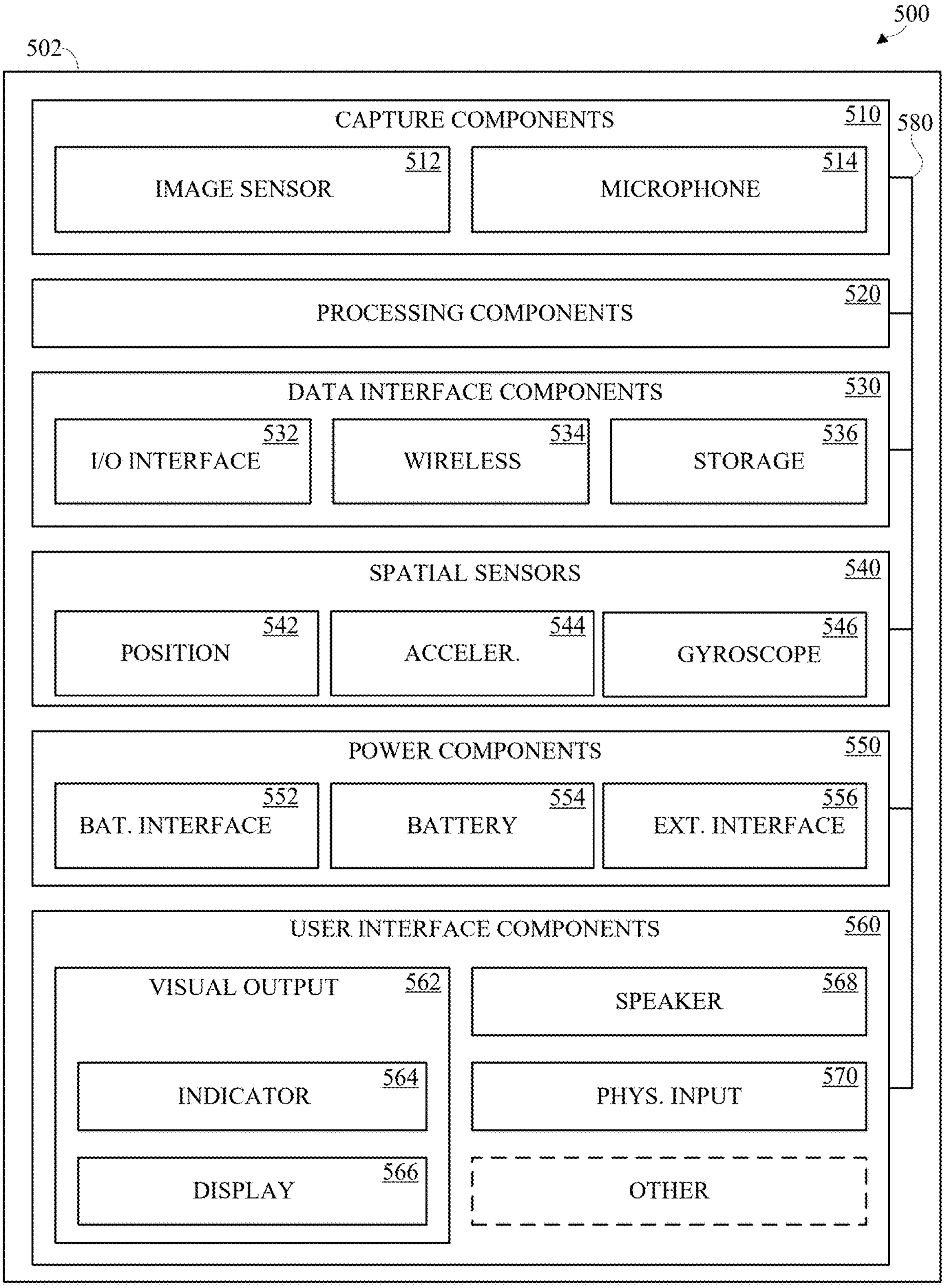
FIG. 5 is a block diagram of electronic components of an image capture apparatus.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 5.

As shown in FIGS. 2A-2B, the image capture apparatus 200 includes the interconnect mechanism 214 structured on a bottom surface of the body 202. The interconnect mechanism 214 may be similar to the interconnect mechanism 140 shown in FIG. 1B.

As shown in FIG. 2B, the image capture apparatus 200 includes the drainage channel 216 for draining liquid from audio components of the image capture apparatus 200.

As shown in FIGS. 2A-2B, the image capture apparatus 200 includes the audio components 218, 220, 222, respectively structured on respective surfaces of the body 202. The audio components 218, 220, 222 may be similar to the microphones 128, 130, 132 and the speaker 138 shown in FIGS. 1A-1B. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts.

As shown in FIGS. 2A-2B, a first audio component 218 is located on a front surface of the body 202, a second audio component 220 is located on a top surface of the body 202, and a third audio component 222 is located on a back surface of the body 202. Other numbers and configurations for the audio components 218, 220, 222 may be used. For example, the audio component 218 may be a drain microphone surrounded by the drainage channel 216 and adjacent to one of the indicators 208 as shown in FIG. 2B.

As shown in FIG. 2B, the image capture apparatus 200 includes the display 224 structured on a front surface of the body 202. The display 224 may be similar to the displays 108, 142 shown in FIGS. 1A-1B. The display 224 may include an I/O interface. The display 224 may include one or more of the indicators 208. The display 224 may receive touch inputs. The display 224 may display image information during video capture. The display 224 may provide status information to a user, such as status information indicating battery power level, memory card capacity, time elapsed for a recorded video, etc. The image capture apparatus 200 may include multiple displays structured on respective surfaces of the body 202. In some implementations, the display 224 may be omitted or combined with another component of the image capture apparatus 200.

As shown in FIG. 2B, the image capture apparatus 200 includes the door 226 structured on, or forming a portion of, the side surface of the body 202. The door 226 may be similar to the door 114 shown in FIG. 1A. For example, the door 226 shown in FIG. 2A includes a release mechanism 228. The release mechanism 228 may include a latch, a button, or other mechanism configured to receive a user input that allows the door 226 to change position. The release mechanism 228 may be used to open the door 226 for a user to access a battery, a battery receptacle, an I/O interface, a memory card interface, etc.

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

Figure 3:
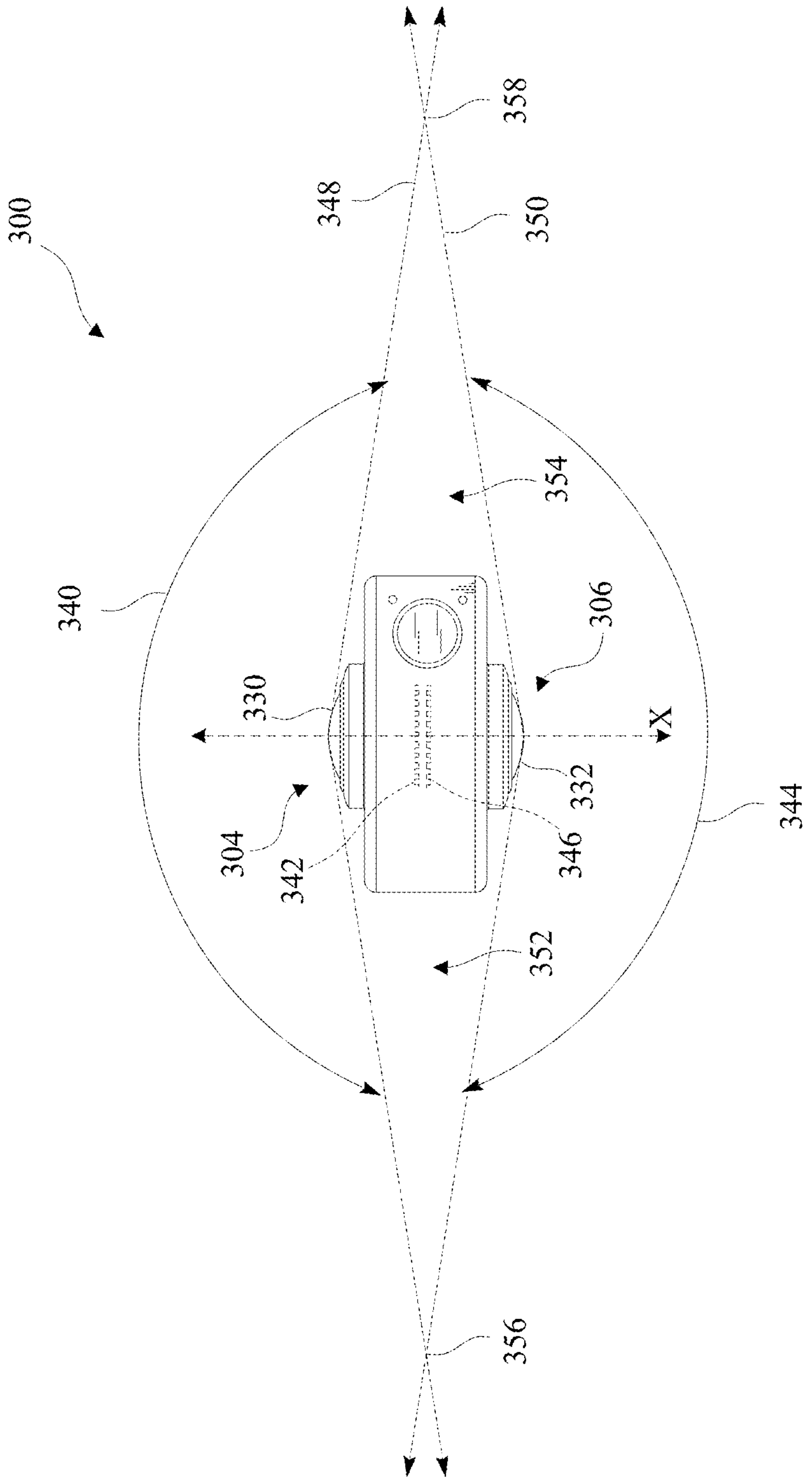
FIG. 3 is a top view of another example of an image capture apparatus.

FIG. 3 is a top view of an image capture apparatus 300. The image capture apparatus 300 is similar to the image capture apparatus 200 of FIGS. 2A-2B and is configured to capture spherical images.

As shown in FIG. 3, a first image capture device 304 includes a first lens 330 and a second image capture device 306 includes a second lens 332. For example, the first image capture device 304 may capture a first image, such as a first hemispheric, or hyper-hemispherical, image, the second image capture device 306 may capture a second image, such as a second hemispheric, or hyper-hemispherical, image, and the image capture apparatus 300 may generate a spherical image incorporating or combining the first image and the second image, which may be captured concurrently, or substantially concurrently.

The first image capture device 304 defines a first field-of-view 340 wherein the first lens 330 of the first image capture device 304 receives light. The first lens 330 directs the received light corresponding to the first field-of-view 340 onto a first image sensor 342 of the first image capture device 304. For example, the first image capture device 304 may include a first lens barrel (not expressly shown), extending from the first lens 330 to the first image sensor 342.

The second image capture device 306 defines a second field-of-view 344 wherein the second lens 332 receives light. The second lens 332 directs the received light corresponding to the second field-of-view 344 onto a second image sensor 346 of the second image capture device 306. For example, the second image capture device 306 may include a second lens barrel (not expressly shown), extending from the second lens 332 to the second image sensor 346.

A boundary 348 of the first field-of-view 340 is shown using broken directional lines. A boundary 350 of the second field-of-view 344 is shown using broken directional lines. As shown, the image capture devices 304, 306 are arranged in a back-to-back (Janus) configuration such that the lenses 330, 332 face in opposite directions, and such that the image capture apparatus 300 may capture spherical images. The first image sensor 342 captures a first hyper-hemispherical image plane from light entering the first lens 330. The second image sensor 346 captures a second hyper-hemispherical image plane from light entering the second lens 332.

As shown in FIG. 3, the fields-of-view 340, 344 partially overlap such that the combination of the fields-of-view 340, 344 forms a spherical field-of-view, except that one or more uncaptured areas 352, 354 may be outside of the fields-of-view 340, 344 of the lenses 330, 332. Light emanating from or passing through the uncaptured areas 352, 354, which may be proximal to the image capture apparatus 300, may be obscured from the lenses 330, 332 and the corresponding image sensors 342, 346, such that content corresponding to the uncaptured areas 352, 354 may be omitted from images captured by the image capture apparatus 300. In some implementations, the image capture devices 304, 306, or the lenses 330, 332 thereof, may be configured to minimize the uncaptured areas 352, 354.

Examples of points of transition, or overlap points, from the uncaptured areas 352, 354 to the overlapping portions of the fields-of-view 340, 344 are shown at 356, 358.

Images contemporaneously captured by the respective image sensors 342, 346 may be combined to form a combined image, such as a spherical image. Generating a combined image may include correlating the overlapping regions captured by the respective image sensors 342, 346, aligning the captured fields-of-view 340, 344, and stitching the images together to form a cohesive combined image. Stitching the images together may include correlating the overlap points 356, 358 with respective locations in corresponding images captured by the image sensors 342, 346. Although a planar view of the fields-of-view 340, 344 is shown in FIG. 3, the fields-of-view 340, 344 are hyper-hemispherical.

A change in the alignment, such as position, tilt, or a combination thereof, of the image capture devices 304, 306, such as of the lenses 330, 332, the image sensors 342, 346, or both, may change the relative positions of the respective fields-of-view 340, 344, may change the locations of the overlap points 356, 358, such as with respect to images captured by the image sensors 342, 346, and may change the uncaptured areas 352, 354, which may include changing the uncaptured areas 352, 354 unequally.

Incomplete or inaccurate information indicating the alignment of the image capture devices 304, 306, such as the locations of the overlap points 356, 358, may decrease the accuracy, efficiency, or both of generating a combined image. In some implementations, the image capture apparatus 300 may maintain information indicating the location and orientation of the image capture devices 304, 306, such as of the lenses 330, 332, the image sensors 342, 346, or both, such that the fields-of-view 340, 344, the overlap points 356, 358, or both may be accurately determined, which may improve the accuracy, efficiency, or both of generating a combined image.

The lenses 330, 332 may be aligned along an axis X as shown, laterally offset from each other (not shown), off-center from a central axis of the image capture apparatus 300 (not shown), or laterally offset and off-center from the central axis (not shown). Whether through use of offset or through use of compact image capture devices 304, 306, a reduction in distance between the lenses 330, 332 along the axis X may improve the overlap in the fields-of-view 340, 344, such as by reducing the uncaptured areas 352, 354.

Images or frames captured by the image capture devices 304, 306 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 356, 358, may be matched accurately to minimize boundary discontinuities.

Figure 4A:
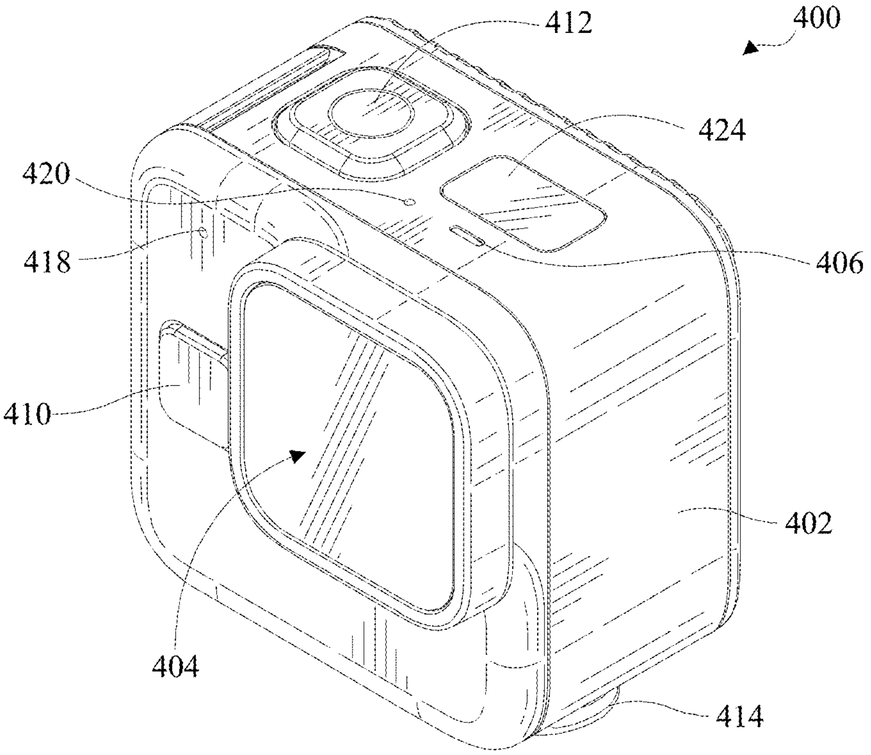
FIGS. 4A-4B are isometric views of another example of an image capture apparatus.
Figure 4B:
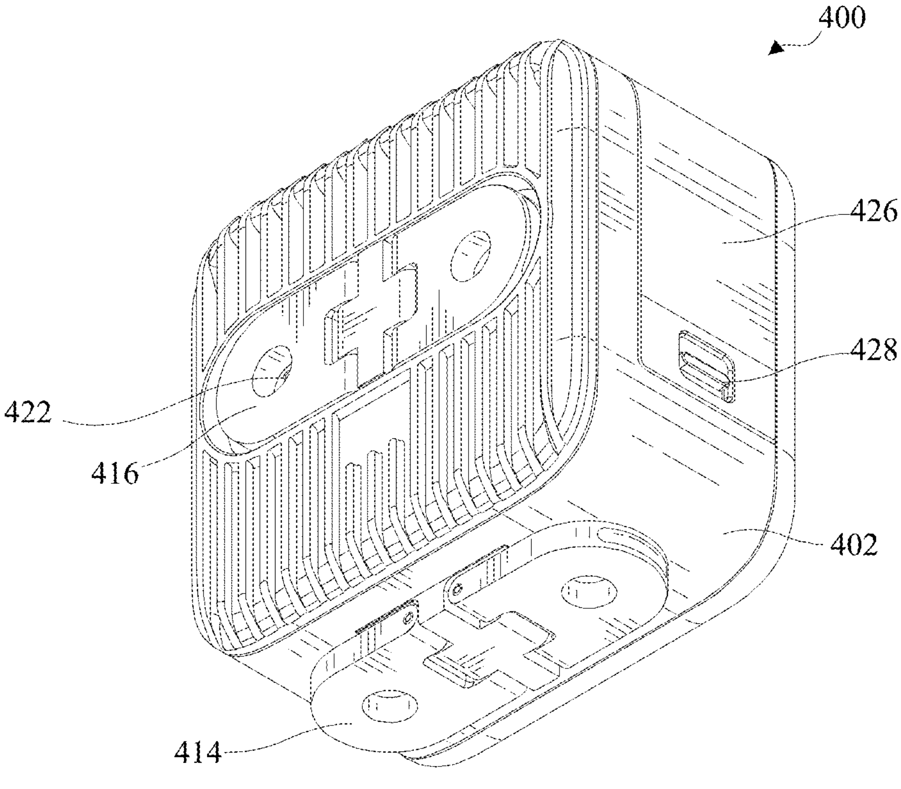

FIGS. 4A-4B illustrate another example of an image capture apparatus 400. The image capture apparatus 400 is similar to the image capture apparatus 100 shown in FIGS. 1A-1B and to the image capture apparatus 200 shown in FIGS. 2A-2B. The image capture apparatus 400 includes a body 402, an image capture device 404, an indicator 406, a mode button 410, a shutter button 412, interconnect mechanisms 414, 416, audio components 418, 420, 422, a display 424, and a door 426 including a release mechanism 428. The arrangement of the components of the image capture apparatus 400 shown in FIGS. 4A-4B is an example, other arrangements of elements may be used.

The body 402 of the image capture apparatus 400 may be similar to the body 102 shown in FIGS. 1A-1B. The image capture device 404 is structured on a front surface of the body 402. The image capture device 404 includes a lens and may be similar to the image capture device 104 shown in FIG. 1A.

As shown in FIG. 4A, the image capture apparatus 400 includes the indicator 406 on a top surface of the body 402. The indicator 406 may be similar to the indicator 106 shown in FIG. 1A. The indicator 406 may indicate a status of the image capture device 204. Although one indicator 406 is shown in FIGS. 4A, the image capture apparatus 400 may include other indictors structured on respective surfaces of the body 402.

As shown in FIGS. 4A, the image capture apparatus 400 includes input mechanisms including the mode button 410, structured on a front surface of the body 402, and the shutter button 412, structured on a top surface of the body 402. The mode button 410 may be similar to the mode button 110 shown in FIG. 1B. The shutter button 412 may be similar to the shutter button 112 shown in FIG. 1A.

The image capture apparatus 400 includes internal electronics (not expressly shown), such as imaging electronics, power electronics, and the like, internal to the body 402 for capturing images and performing other functions of the image capture apparatus 400. An example showing internal electronics is shown in FIG. 5.

As shown in FIGS. 4A-4B, the image capture apparatus 400 includes the interconnect mechanisms 414, 416, with a first interconnect mechanism 414 structured on a bottom surface of the body 402 and a second interconnect mechanism 416 disposed within a rear surface of the body 402. The interconnect mechanisms 414, 416 may be similar to the interconnect mechanism 140 shown in FIG. 1B and the interconnect mechanism 214 shown in FIG. 2A.

As shown in FIGS. 4A-4B, the image capture apparatus 400 includes the audio components 418, 420, 422 respectively structured on respective surfaces of the body 402. The audio components 418, 420, 422 may be similar to the microphones 128, 130, 132 and the speaker 138 shown in FIGS. 1A-1B. One or more of the audio components 418, 420, 422 may be, or may include, audio sensors, such as microphones, to receive and record audio signals, such as voice commands or other audio, in conjunction with capturing images or video. One or more of the audio components 418, 420, 422 may be, or may include, an audio presentation component that may present, or play, audio, such as to provide notifications or alerts.

As shown in FIGS. 4A-4B, a first audio component 418 is located on a front surface of the body 402, a second audio component 420 is located on a top surface of the body 402, and a third audio component 422 is located on a rear surface of the body 402. Other numbers and configurations for the audio components 418, 420, 422 may be used.

As shown in FIG. 4A, the image capture apparatus 400 includes the display 424 structured on a front surface of the body 402. The display 424 may be similar to the displays 108, 142 shown in FIGS. 1A-1B. The display 424 may include an I/O interface. The display 424 may receive touch inputs. The display 424 may display image information during video capture. The display 424 may provide status information to a user, such as status information indicating battery power level, memory card capacity, time elapsed for a recorded video, etc. The image capture apparatus 400 may include multiple displays structured on respective surfaces of the body 402. In some implementations, the display 424 may be omitted or combined with another component of the image capture apparatus 200.

As shown in FIG. 4B, the image capture apparatus 400 includes the door 426 structured on, or forming a portion of, the side surface of the body 402. The door 426 may be similar to the door 226 shown in FIG. 2B. The door 426 shown in FIG. 4B includes the release mechanism 428. The release mechanism 428 may include a latch, a button, or other mechanism configured to receive a user input that allows the door 426 to change position. The release mechanism 428 may be used to open the door 426 for a user to access a battery, a battery receptacle, an I/O interface, a memory card interface, etc.

In some embodiments, the image capture apparatus 400 may include features or components other than those described herein, some features or components described herein may be omitted, or some features or components described herein may be combined. For example, the image capture apparatus 400 may include additional interfaces or different interface features, interchangeable lenses, cold shoes, or hot shoes.

FIG. 5 is a block diagram of electronic components in an image capture apparatus 500. The image capture apparatus 500 may be a single-lens image capture device, a multi-lens image capture device, or variations thereof, including an image capture apparatus with multiple capabilities such as the use of interchangeable integrated sensor lens assemblies. Components, such as electronic components, of the image capture apparatus 100 shown in FIGS. 1A-1B, the image capture apparatus 200 shown in FIGS. 2A-2B, the image capture apparatus 300 shown in FIG. 3, or the image capture apparatus 400 shown in FIGS. 4A-4B, may be implemented as shown in FIG. 5.

The image capture apparatus 500 includes a body 502. The body 502 may be similar to the body 102 shown in FIGS. 1A-1B, the body 202 shown in FIGS. 2A-2B, or the body 402 shown in FIGS. 4A-4B. The body 502 includes electronic components such as capture components 510, processing components 520, data interface components 530, spatial sensors 540, power components 550, user interface components 560, and a bus 580.

The capture components 510 include an image sensor 512 for capturing images. Although one image sensor 512 is shown in FIG. 5, the capture components 510 may include multiple image sensors. The image sensor 512 may be similar to the image sensors 342, 346 shown in FIG. 3. The image sensor 512 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 512 detects light, such as within a defined spectrum, such as the visible light spectrum or the infrared spectrum, incident through a corresponding lens such as the first lens 330 with respect to the first image sensor 342 or the second lens 332 with respect to the second image sensor 346 as shown in FIG. 3. The image sensor 512 captures detected light as image data and conveys the captured image data as electrical signals (image signals or image data) to the other components of the image capture apparatus 500, such as to the processing components 520, such as via the bus 580.

The capture components 510 include a microphone 514 for capturing audio. Although one microphone 514 is shown in FIG. 5, the capture components 510 may include multiple microphones. The microphone 514 detects and captures, or records, sound, such as sound waves incident upon the microphone 514. The microphone 514 may detect, capture, or record sound in conjunction with capturing images by the image sensor 512. The microphone 514 may detect sound to receive audible commands to control the image capture apparatus 500. The microphone 514 may be similar to the microphones 128, 130, 132 shown in FIGS. 1A-1B, the audio components 218, 220, 222 shown in FIGS. 2A-2B, or the audio components 418, 420, 422 shown in FIGS. 4A-4B.

The processing components 520 perform image signal processing, such as filtering, tone mapping, or stitching, to generate, or obtain, processed images, or processed image data, based on image data obtained from the image sensor 512. The processing components 520 may include one or more processors having single or multiple processing cores. In some implementations, the processing components 520 may include, or may be, an application specific integrated circuit (ASIC) or a digital signal processor (DSP). For example, the processing components 520 may include a custom image signal processor. The processing components 520 conveys data, such as processed image data, with other components of the image capture apparatus 500 via the bus 580. In some implementations, the processing components 520 may include an encoder, such as an image or video encoder that may encode, decode, or both, the image data, such as for compression coding, transcoding, or a combination thereof.

Although not shown expressly in FIG. 5, the processing components 520 may include memory, such as a random-access memory (RAM) device, which may be non-transitory computer-readable memory. The memory of the processing components 520 may include executable instructions and data that can be accessed by the processing components 520.

The data interface components 530 communicate with other, such as external, electronic devices, such as a remote control, a smartphone, a tablet computer, a laptop computer, a desktop computer, or an external computer storage device. For example, the data interface components 530 may receive commands to operate the image capture apparatus 500. In another example, the data interface components 530 may transmit image data to transfer the image data to other electronic devices. The data interface components 530 may be configured for wired communication, wireless communication, or both. As shown, the data interface components 530 include an I/O interface 532, a wireless data interface 534, and a storage interface 536. In some implementations, one or more of the I/O interface 532, the wireless data interface 534, or the storage interface 536 may be omitted or combined.

The I/O interface 532 may send, receive, or both, wired electronic communications signals. For example, the I/O interface 532 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 532 is shown in FIG. 5, the data interface components 530 include multiple I/O interfaces. The I/O interface 532 may be similar to the data interface 124 shown in FIG. 1B.

The wireless data interface 534 may send, receive, or both, wireless electronic communications signals. The wireless data interface 534 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 534 is shown in FIG. 5, the data interface components 530 include multiple wireless data interfaces. The wireless data interface 534 may be similar to the data interface 124 shown in FIG. 1B. In some implementations, the wireless data interface 534 may include one or more transceivers coupled with one or more antennas. The wireless data interface 534 may be configured to facilitate a 2×2 dual-band multiple input multiple output (MIMO) communications with a Wi-Fi network. For example, the wireless data interface 534 may be configured to facilitate MIMO communications on a 2.4 GHz band and MIMO communications on a 5 GHz band.

The storage interface 536 may include a memory card connector, such as a memory card receptacle, configured to receive and operatively couple to a removable storage device, such as a memory card, and to transfer, such as read, write, or both, data between the image capture apparatus 500 and the memory card, such as for storing images, recorded audio, or both captured by the image capture apparatus 500 on the memory card. Although one storage interface 536 is shown in FIG. 5, the data interface components 530 include multiple storage interfaces. The storage interface 536 may be similar to the data interface 124 shown in FIG. 1B.

The spatial, or spatiotemporal, sensors 540 detect the spatial position, movement, or both, of the image capture apparatus 500. As shown in FIG. 5, the spatial sensors 540 include a position sensor 542, an accelerometer 544, and a gyroscope 546. The position sensor 542, which may be a global positioning system (GPS) sensor, may determine a geospatial position of the image capture apparatus 500, which may include obtaining, such as by receiving, temporal data, such as via a GPS signal. The accelerometer 544, which may be a three-axis accelerometer, may measure linear motion, linear acceleration, or both of the image capture apparatus 500. The gyroscope 546, which may be a three-axis gyroscope, may measure rotational motion, such as a rate of rotation, of the image capture apparatus 500. In some implementations, the spatial sensors 540 may include other types of spatial sensors. In some implementations, one or more of the position sensor 542, the accelerometer 544, and the gyroscope 546 may be omitted or combined.

The power components 550 distribute electrical power to the components of the image capture apparatus 500 for operating the image capture apparatus 500. As shown in FIG. 5, the power components 550 include a battery interface 552, a battery 554, and an external power interface 556 (ext. interface). The battery interface 552 (bat. interface) operatively couples to the battery 554, such as via conductive contacts to transfer power from the battery 554 to the other electronic components of the image capture apparatus 500. The battery interface 552 may be similar to the battery receptacle 126 shown in FIG. 1B. The external power interface 556 obtains or receives power from an external source, such as a wall plug or external battery, and distributes the power to the components of the image capture apparatus 500, which may include distributing power to the battery 554 via the battery interface 552 to charge the battery 554. Although one battery interface 552, one battery 554, and one external power interface 556 are shown in FIG. 5, any number of battery interfaces, batteries, and external power interfaces may be used. In some implementations, one or more of the battery interface 552, the battery 554, and the external power interface 556 may be omitted or combined. For example, in some implementations, the external interface 556 and the I/O interface 532 may be combined.

The user interface components 560 receive input, such as user input, from a user of the image capture apparatus 500, output, such as display or present, information to a user, or both receive input and output information, such as in accordance with user interaction with the image capture apparatus 500.

As shown in FIG. 5, the user interface components 560 include visual output components 562 to visually communicate information, such as to present captured images. As shown, the visual output components 562 include an indicator 564 and a display 566. The indicator 564 may be similar to the indicator 106 shown in FIG. 1A, the indicators 208 shown in FIGS. 2A-2B, or the indicator 406 shown in FIG. 4A. The display 566 may be similar to the display 108 shown in FIG. 1A, the display 142 shown in FIG. 1B, the display 224 shown in FIG. 2B, or the display 424 shown in FIG. 4A. Although the visual output components 562 are shown in FIG. 5 as including one indicator 564, the visual output components 562 may include multiple indicators. Although the visual output components 562 are shown in FIG. 5 as including one display 566, the visual output components 562 may include multiple displays. In some implementations, one or more of the indicator 564 or the display 566 may be omitted or combined.

As shown in FIG. 5, the user interface components 560 include a speaker 568. The speaker 568 may be similar to the speaker 138 shown in FIG. 1B, the audio components 218, 220, 222 shown in FIGS. 2A-2B, or the audio components 418, 420, 422 shown in FIGS. 4A-4B. Although one speaker 568 is shown in FIG. 5, the user interface components 560 may include multiple speakers. In some implementations, the speaker 568 may be omitted or combined with another component of the image capture apparatus 500, such as the microphone 514.

As shown in FIG. 5, the user interface components 560 include a physical input interface 570. The physical input interface 570 may be similar to the mode buttons 110, 210, 410 shown in FIGS. 1A, 2A, and 4A or the shutter buttons 112, 212, 412 shown in FIGS. 1A, 2B, and 4A. Although one physical input interface 570 is shown in FIG. 5, the user interface components 560 may include multiple physical input interfaces. In some implementations, the physical input interface 570 may be omitted or combined with another component of the image capture apparatus 500. The physical input interface 570 may be, for example, a button, a toggle, a switch, a dial, or a slider.

As shown in FIG. 5, the user interface components 560 include a broken line border box labeled "other" to indicate that components of the image capture apparatus 500 other than the components expressly shown as included in the user interface components 560 may be user interface components. For example, the microphone 514 may receive, or capture, and process audio signals to obtain input data, such as user input data corresponding to voice commands. In another example, the image sensor 512 may receive, or capture, and process image data to obtain input data, such as user input data corresponding to visible gesture commands. In another example, one or more of the spatial sensors 540, such as a combination of the accelerometer 544 and the gyroscope 546, may receive, or capture, and process motion data to obtain input data, such as user input data corresponding to motion gesture commands.

In some implementations, an electronic device such as an image capture apparatus (e.g., the image capture apparatus 300, the image capture apparatus 200, and/or the image capture apparatus 100) may include, within its body, a metal housing and a wireless data interface including one or more transceivers coupled with one or more antennas. The one or more antennas may be configured to facilitate 2×2 dual-band MIMO Wi-Fi communications. The one or more antennas may be configured to fit within a form factor of the electronic device.

Figure 6A:
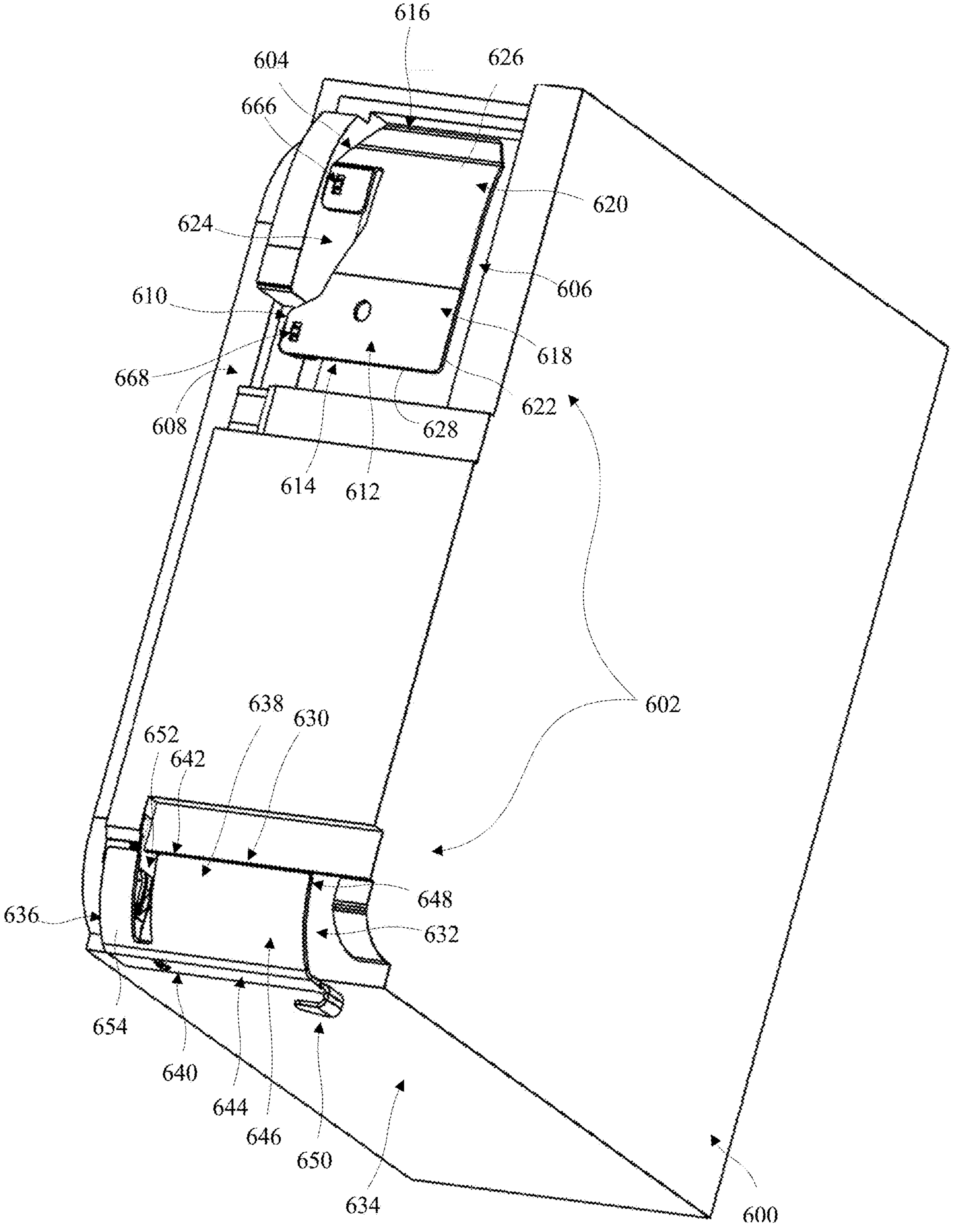
FIG. 6A is an isometric view of a portion of an electronic device, showing a housing and an antenna system.
Figures 6B, 6C:
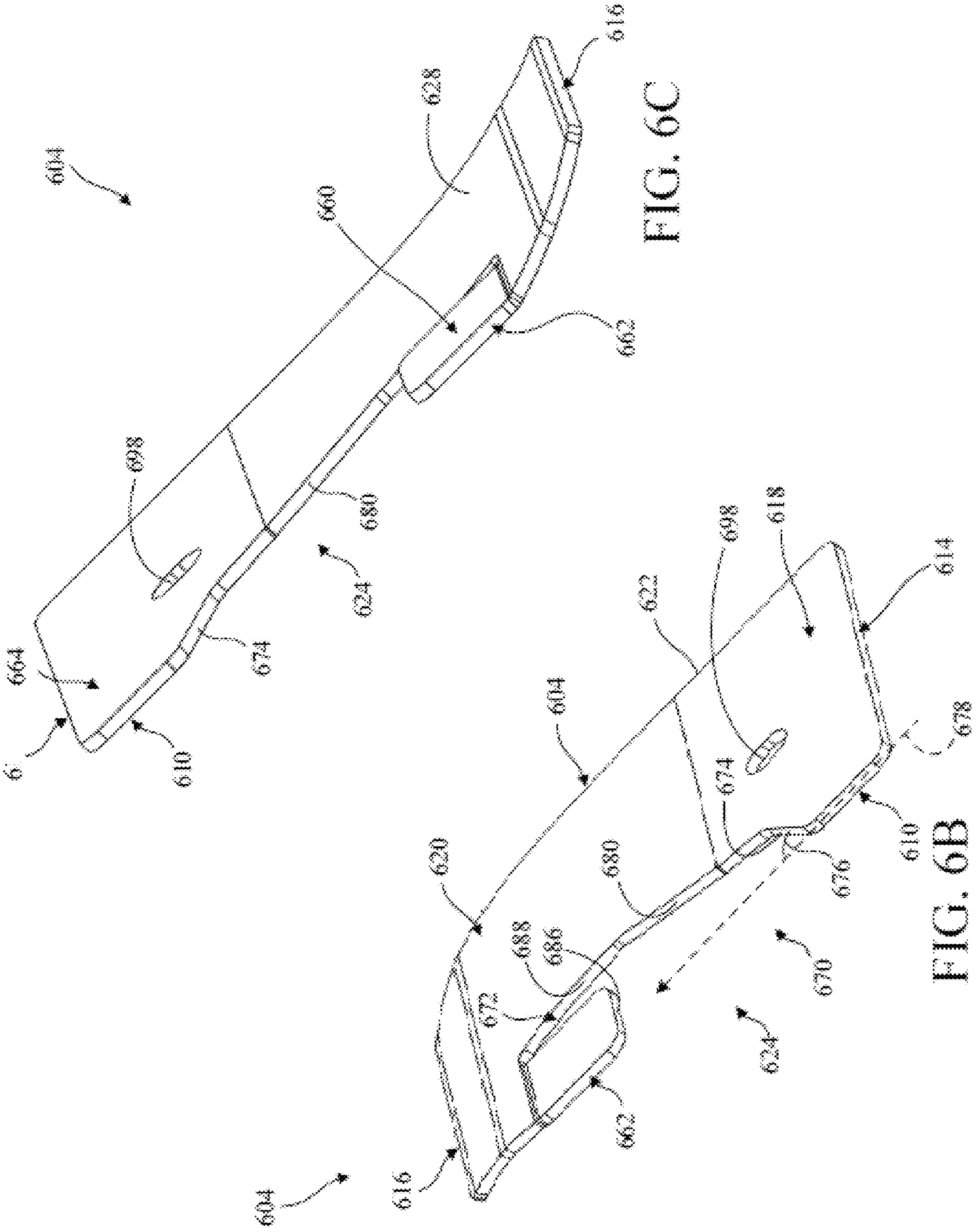
FIGS. 6B and 6C are perspective views of a first antenna element of the antenna system of FIG. 6A.
Figure 6E:
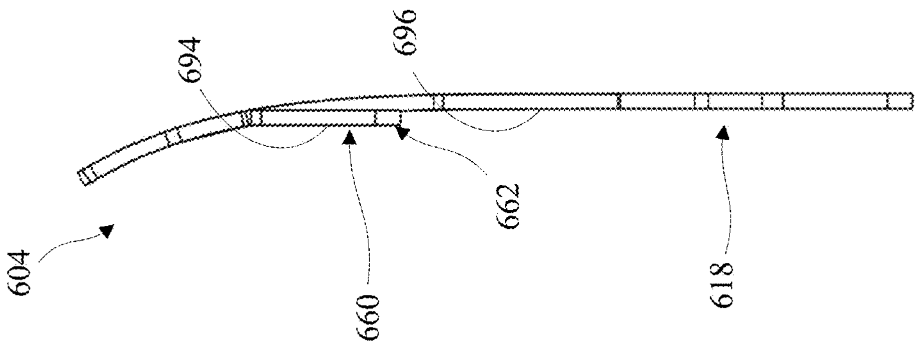
FIG. 6E is a side view of the first antenna element of the antenna system of FIG. 6A.
Figure 6D:
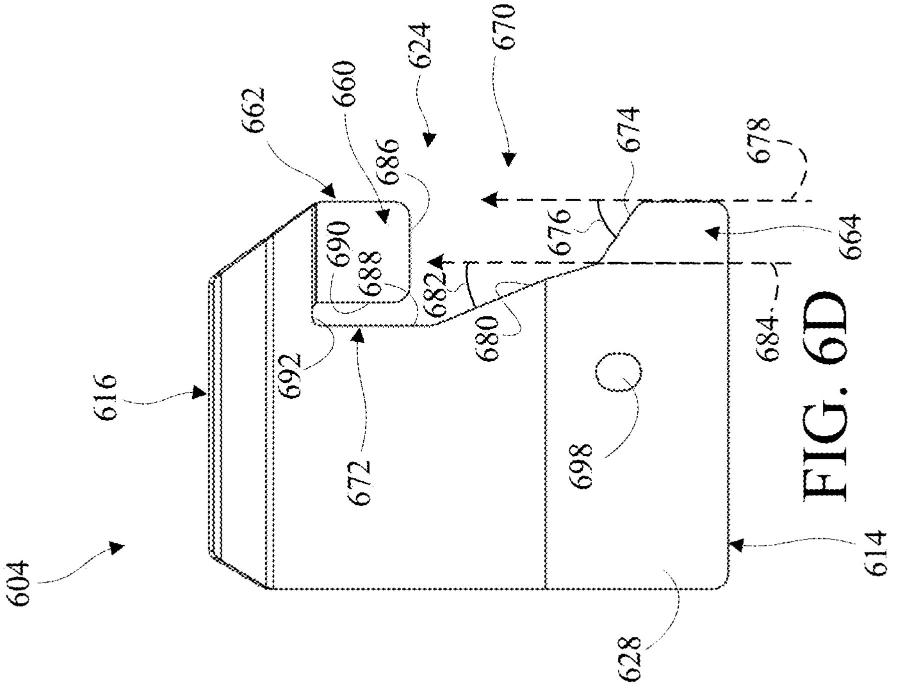
FIG. 6D is a rear view of the first antenna element of the antenna system of FIG. 6A.

FIGS. 6A-6G include various views of an example of an electronic device having a housing 600 and an antenna system 602. FIG. 6A is an isometric view of a portion of the electronic device, showing the housing 600 and the antenna system 602. FIGS. 6B and 6C are perspective views of a first antenna element 604 of the antenna system 602. FIG. 6D is a rear view of the first antenna element 604 and FIG. 6E is a side view of the first antenna element 604. The electronic device may be, be similar to, include, or be included in, the image capture apparatus 400 shown in FIGS. 4A and 4B, the image capture apparatus 300 shown in FIG. 3, the image capture apparatus 200 shown in FIGS. 2A and 2B, and/or the image capture apparatus 100 shown in FIGS. 1A and 1B. In some implementations, the housing 600 may be a metal housing.

As shown in FIGS. 6A-6E, the antenna system 602 includes the first antenna element 604 that is configured to be disposed at a first location 606 adjacent to a side 608 of the housing 600. The first antenna element 604 includes a first left edge 610 extending along a first body 612 between a first lower end 614 and a first upper end 616. The first body 612 includes a first flat portion 618 and a first arcuate portion 620. A first right edge 622 extends along the first body 612 between the first lower end 614 and the first upper end 616. A first cutout 624 configured to facilitate dual-band radiation associated with the first antenna element 604 is defined in the first left edge 610 and extends from a front surface 626 of the first body 612 to a first rear surface 628 of the first body 612.

Figure 6G:
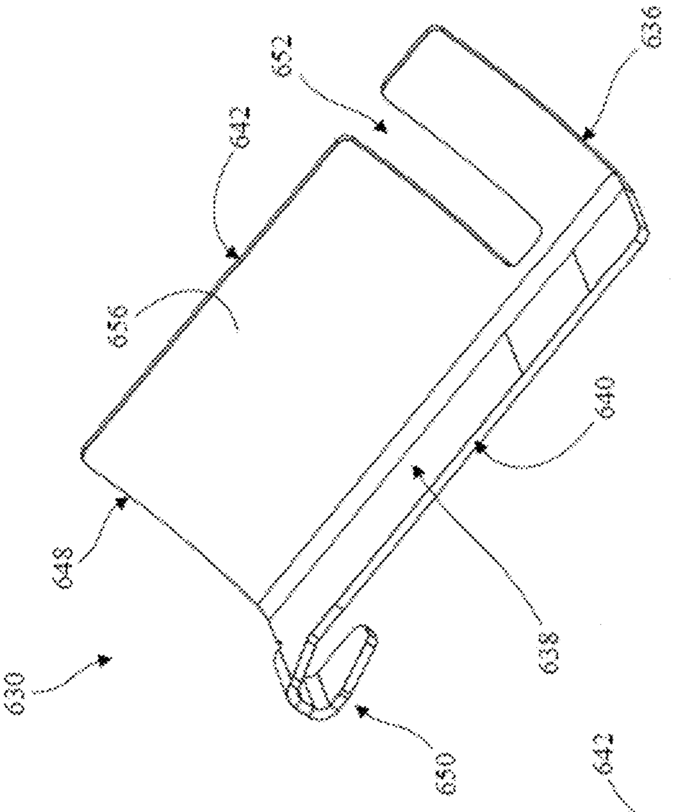
FIG. 6G is a rear perspective view of the second antenna element of the antenna system of FIG. 6A.
Figure 6F:
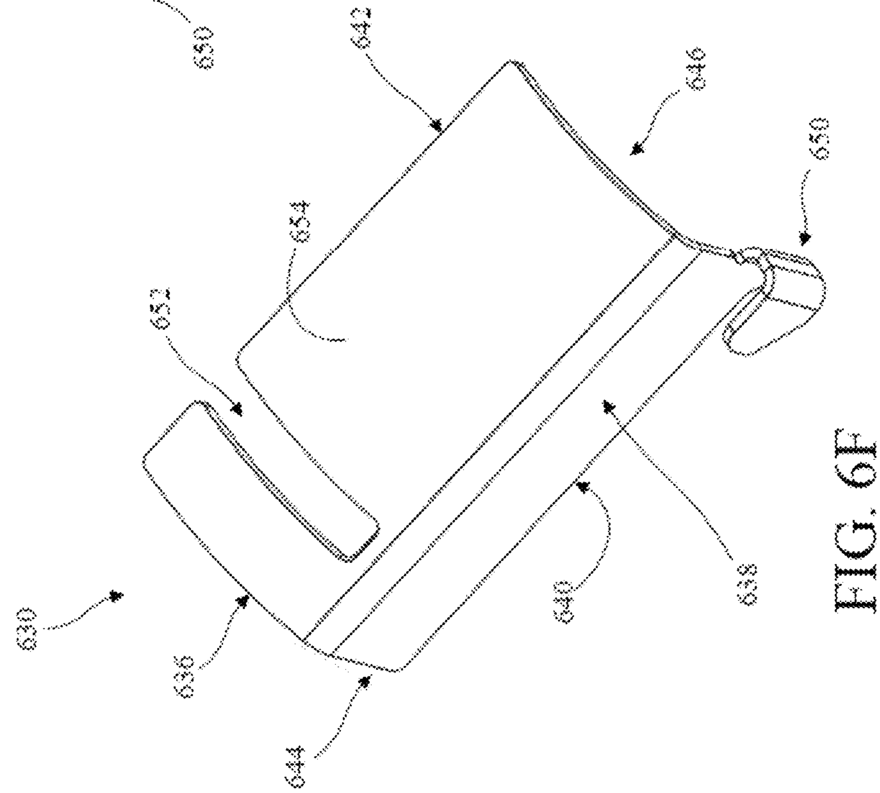
FIG. 6F is a front perspective view of the second antenna element of the antenna system of FIG. 6A.

As is further shown in FIG. 6A, a second antenna element 630 is configured to be disposed at a second location 632 adjacent to the side 608 of the housing 600. At least a portion of the second antenna element 630 is disposed adjacent to an additional side 634 of the housing 600. FIGS. 6F and 6G are perspective views of the second antenna element 630. The second antenna element 630 includes a second left edge 636 extending along a second body 638 between a second lower end 640 and a second upper end 642. The second body 638 includes a second flat portion 644 and a second arcuate portion 646. A second right edge 648 extends along the second body 638 between the second upper end 642 and a hook feature 650 that protrudes from the second right edge 648. The second antenna element 630 includes a second cutout 652 configured to facilitate dual-band radiation associated with the second antenna element 630. The second cutout 652 is defined in the second arcuate portion 646 and extends from a second front surface 654 of the second body 638 to a second rear surface 656 of the second body 638. The second cutout 652 may be a slot extending perpendicularly away from the second upper end 642 toward the second lower end 640 of the second body 638.

As shown with more specificity in FIGS. 6B-6E, the first antenna element 604 includes a first contact area 660 corresponding to a portion of the first rear surface 628 disposed on a tab 662 defined by the first cutout 624. The first antenna element 604 also includes a second contact area 664 corresponding to another portion of the first rear surface 628 disposed adjacent to the first cutout 624. The first contact area 660 may be configured to be engaged by a first antenna clip 666 (FIG. 6A) and the second contact area 664 may be configured to be engaged by a second antenna clip 668 (FIG. 6A). The first contact area 660 and the second contact area 664 may be coated with a highly conductive substance such as, for example, gold, to facilitate electrical conduction between the first antenna element 604 and the antenna clips 666 and 668. The antenna clips 666 and 668 may be configured as part of a circuit for providing signals to, and obtaining signals from, the first antenna element 604.

In some implementations, as indicated above, the first cutout 624 may be configured to facilitate dual-band radiation associated with the first antenna element 604. For example, the first cutout 624 may be designed, in connection with the first contact area 660 and the second contact area 664, to optimize a function that is configured for enabling 2×2 dual-band MIMO communications within the space limitations imposed by the form factor. FIGS. 6B-6D show an example of a design of the first cutout 624 that optimizes such a function.

As shown in FIGS. 6B and 6D, the first cutout 624 includes a notch portion 670 and a slot portion 672. The notch portion 670 is partly defined by a first angled edge surface 674 that extends inward away from the first left edge 610. The first angled edge surface 674 may be configured in accordance with a first angle 676 between the first angled edge surface 674 and an axis 678 that extends along the first left edge 610 in a direction from the first lower end 614 toward the first upper end 616. The notch portion 670 is further defined, in part, by a second angled edge surface 680 extending from the first angled edge surface 674. The second angled edge surface 680 may be configured in accordance with a second angle 682 between the second angled edge surface 680 and an axis 684 (shown in FIG. 6D) that extends parallel to the axis 678. The notch portion 670 may be further defined, in part, by a first tab edge surface 686 that extends along an edge of the tab 662 perpendicular to the axes 678 and 684.

As shown, the slot portion 672 may be defined, in part, by a first slot edge surface 688 that extends from the second angled edge surface 680 in a manner parallel to the axes 678 and 684 in a direction away from the first lower end 614. The slot portion 672 may be further defined, in part, by a second slot edge surface 690 that is parallel to the first slot edge surface 688 and a third slot edge surface 692 that connects the first slot edge surface 688 to the second slot edge surface 690. In some implementations, as shown in FIG. 6E, a portion 694 of the first rear surface 628 corresponding to the first contact area 660 on the tab 662 may extend at least approximately parallel to, but not coplanar with, a portion 696 of the first rear surface 628 corresponding to the first flat portion 618 of the first body 612. In some implementations, the slot portion 672 is designed to allow the first contact area 660 to engage (e.g., by pressing against) the first antenna clip 666 perpendicularly. As shown in FIGS. 6B-6D, the first antenna element 604 may include an aperture 698. The aperture 698 may be configured to receive a post to facilitate positioning the first antenna element 604 with respect to other components, as shown, for example, in FIG. 7B.

Figure 7B:
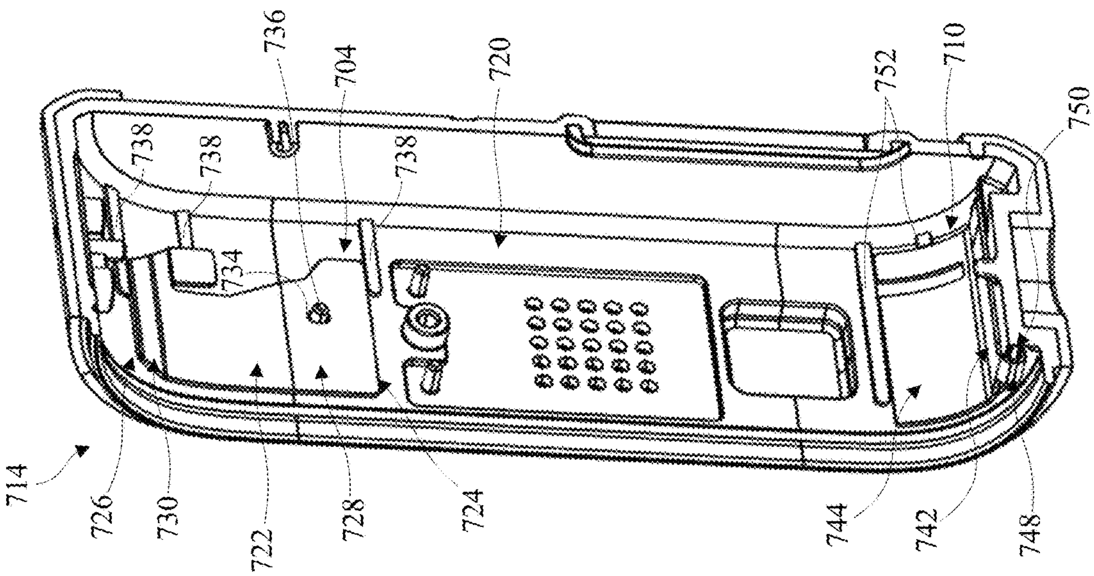
FIG. 7B is an interior perspective view of an edge portion of an outer body of the image capture apparatus of FIG. 7A.
Figure 7A:
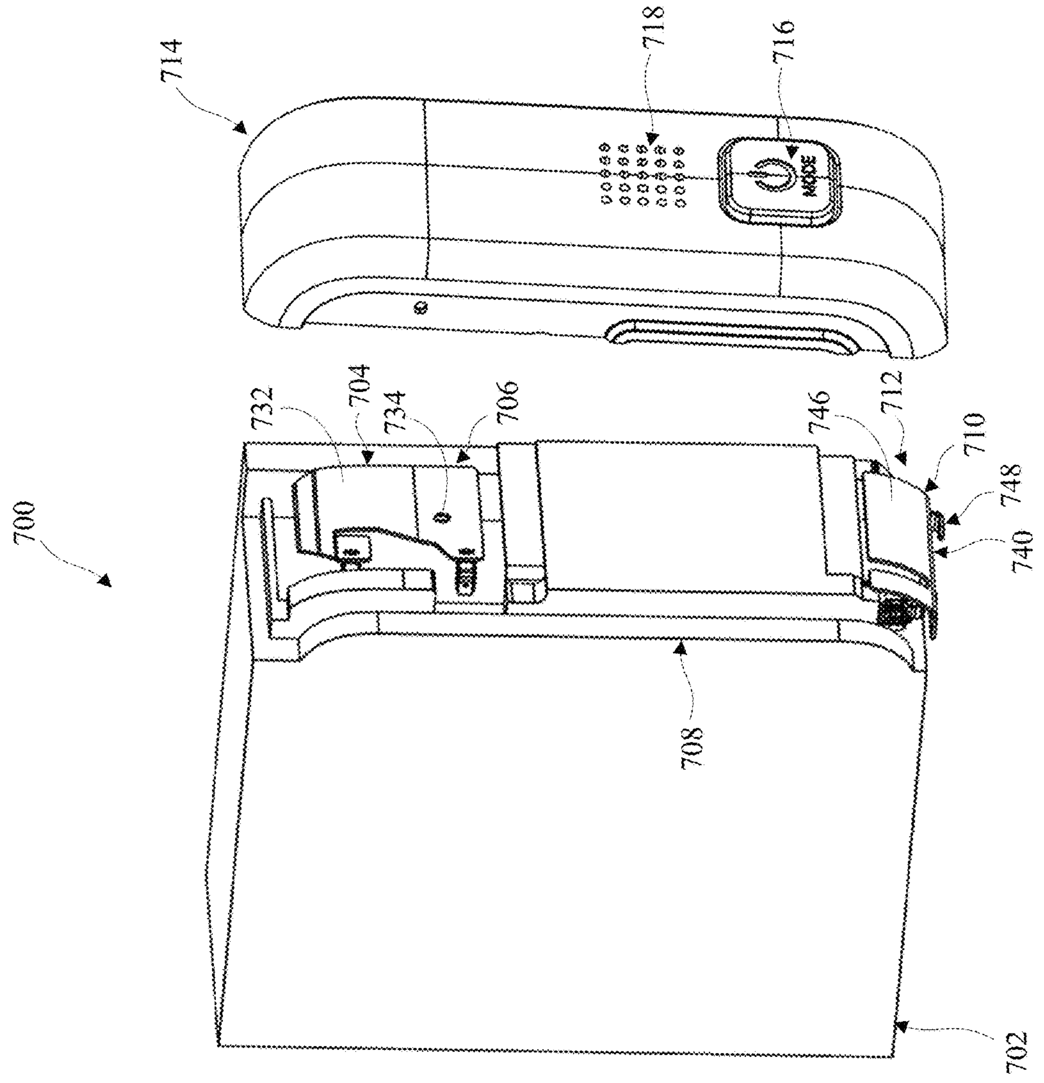
FIG. 7A is an exploded perspective view of a portion of an image capture apparatus.

FIGS. 7A-7D show an example of a portion of an image capture apparatus 700 having an antenna system configured in accordance with a form factor. FIG. 7A is an exploded perspective view of the portion of the image capture apparatus 700. As shown, the image capture apparatus 700 includes housing 702. The housing 702 may be a metal housing. The antenna system includes a first antenna element 704 configured to be disposed at a first location 706 adjacent to a side 708 of the housing 702. A second antenna element 710 is configured to be disposed at a second location 712 adjacent to the side 708 of the housing 702. An edge portion 714 of an outer body of the image capture apparatus 700 may be configured to be disposed adjacent to the side 708 of the housing 702. As shown, the edge portion 714 may include, for example, a mode button 716 (e.g., the mode button 210 shown in FIGS. 2A and 2B) and a set 718 of apertures that may be configured to support an audio component (e.g., one or more of the audio components 218, 220, or 222 shown in FIGS. 2A and 2B) and/or may be configured to function as a vent to cool the image capture apparatus 700.

FIG. 7B is an interior perspective view of the edge portion 714 of the outer body of the image capture apparatus 700. As shown, the first antenna element 704 and the second antenna element 710 may be designed to fit the form factor of an inner wall 720 of the edge portion 714.

As shown, for example, the first antenna element 704 includes a first body 722 having a first lower end 724 and a first upper end 726. The first body 722 includes a first flat portion 728 and a first arcuate portion 730. The first flat portion 728 may be designed to be parallel to an adjacent flat portion of the inner wall 720 and the first arcuate portion 730 may be designed to be parallel to an adjacent arcuate portion of the inner wall 720. In some implementations, the first flat portion 728 may be disposed against the adjacent flat portion of the inner wall 720 and the first arcuate portion 730 may be disposed against the adjacent arcuate portion of the inner wall 720. In some implementations, an adhesive may be disposed on a front surface 732 of the first antenna element 704 for fixing the inner wall 720 to the first antenna element 704. In some implementations, as shown, the first antenna element 704 may include an aperture 734 defined therein and configured to receive a positioning post 736 fixed to the inner wall 720 of the edge portion 714. As shown, the inner wall 720 of the edge portion 714 may include a number of antenna guides 738, which may be, for example, raised portions of the inner wall 720 that serve as guides for positioning the first antenna element 704 against the inner wall 720. Any number of combinations of antenna guides 738, apertures 734 and positioning posts 736 may be used to facilitate alignment of the first antenna element 704 during assembly.

As is further shown in FIGS. 7A and 7B, the second antenna element 710 includes a second body 740 that includes a second flat portion 742 and a second arcuate portion 744. The second flat portion 742 may be designed to be parallel to an adjacent flat portion of the inner wall 720 and the second arcuate portion 744 may be designed to be parallel to an adjacent arcuate portion of the inner wall 720. In some implementations, the second flat portion 742 may be disposed against the adjacent flat portion of the inner wall 720 and the second arcuate portion 744 may be disposed against the adjacent arcuate portion of the inner wall 720. In some implementations, an adhesive may be disposed on a front surface 746 of the second antenna element 710 for fixing the inner wall 720 to the second antenna element 710. As shown, the second antenna element 710 may include a hook feature 748 configured to fit over a mounting feature 750 disposed on the inner wall 720 of the edge portion 714. As shown, the inner wall 720 of the edge portion 714 may include a number of antenna guides 752, which may be, for example, raised portions of the inner wall 720 that serve as guides for positioning the second antenna element 710 against the inner wall 720. Any number of combinations of antenna guides 752, hook features 748, and/or mounting features 750, may be used to facilitate alignment of the second antenna element 710 during assembly.

The close proximity of the first antenna element 704 to the second antenna element 710 (e.g., as a result of the form factor) may cause mutual coupling between the antenna elements 704 and 710. In a Multiple-Input Multiple-Output (MIMO) system, multiple antennas are used to simultaneously transmit and receive data streams, increasing data throughput and improving signal reliability. The proximity of the antennas can cause significant interaction between them, leading to signal degradation and reduced performance. Matching networks mitigate these effects by ensuring that each antenna operates efficiently, even in the presence of mutual coupling. Matching networks are electronic circuits that match the impedance of the antenna elements with that of the transmitter or receiver circuits. Their primary purpose is to maximize power transfer between the antennas and the associated circuitry while minimizing signal reflection and loss.

Figure 7D:
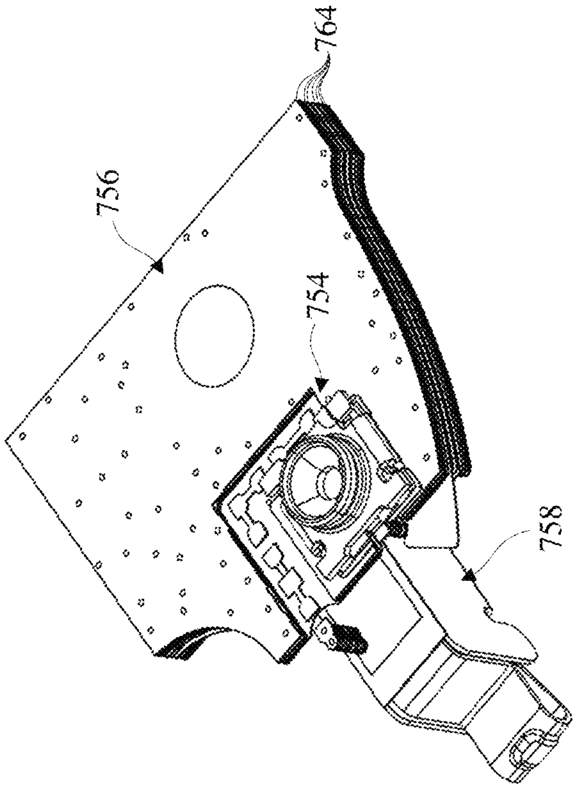
FIG. 7D is an inverted perspective view of the portion of the circuit assembly of the image capture apparatus of FIG. 7C.

Accordingly, implementations may include one or more matching networks associated with each of the first antenna element 704 and the second antenna element 710. The matching networks accommodate the differing impedance characteristics of the dual bands and help isolate the antennas from each other, reducing interference. In some implementations, because of the manufacturing constraints of the form factor of the image capture apparatus 700, the image capture apparatus 700 may include a compact matching network 754 associated with the second antenna element 710, as shown in FIG. 7D.

Figure 7C:
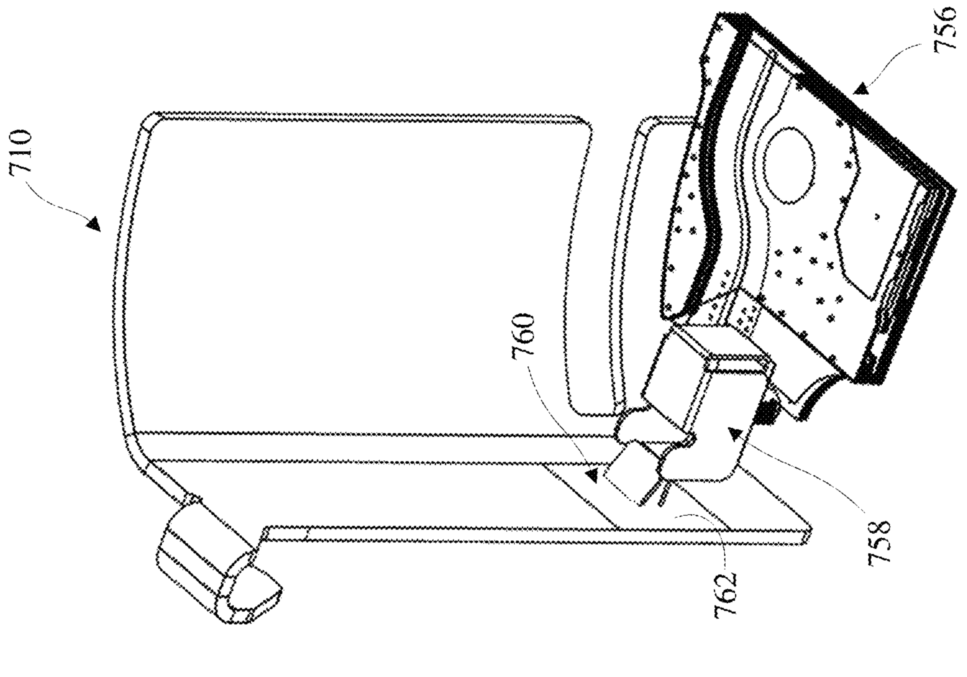
FIG. 7C is a rear perspective view of a second antenna element of the image capture apparatus of FIG. 7A and a portion of a circuit assembly of the image capture apparatus of FIG. 7A.

FIG. 7C is a rear perspective view of the second antenna element 710 and a portion of a circuit assembly 756. FIG. 7D is an inverted perspective view of the portion of the circuit assembly 756. As shown in FIGS. 7C and 7D, the compact matching network 754 may be included as part of a circuit assembly 756 electrically coupled to an antenna clip

758 that is configured to engage a contact area 760 corresponding to a portion of a rear surface 762 of the second antenna element 710. The circuit assembly 756 may include a number of layers 764 to facilitate fitting circuits for the image capture apparatus 700 that comply with the form factor.

Figure 8:
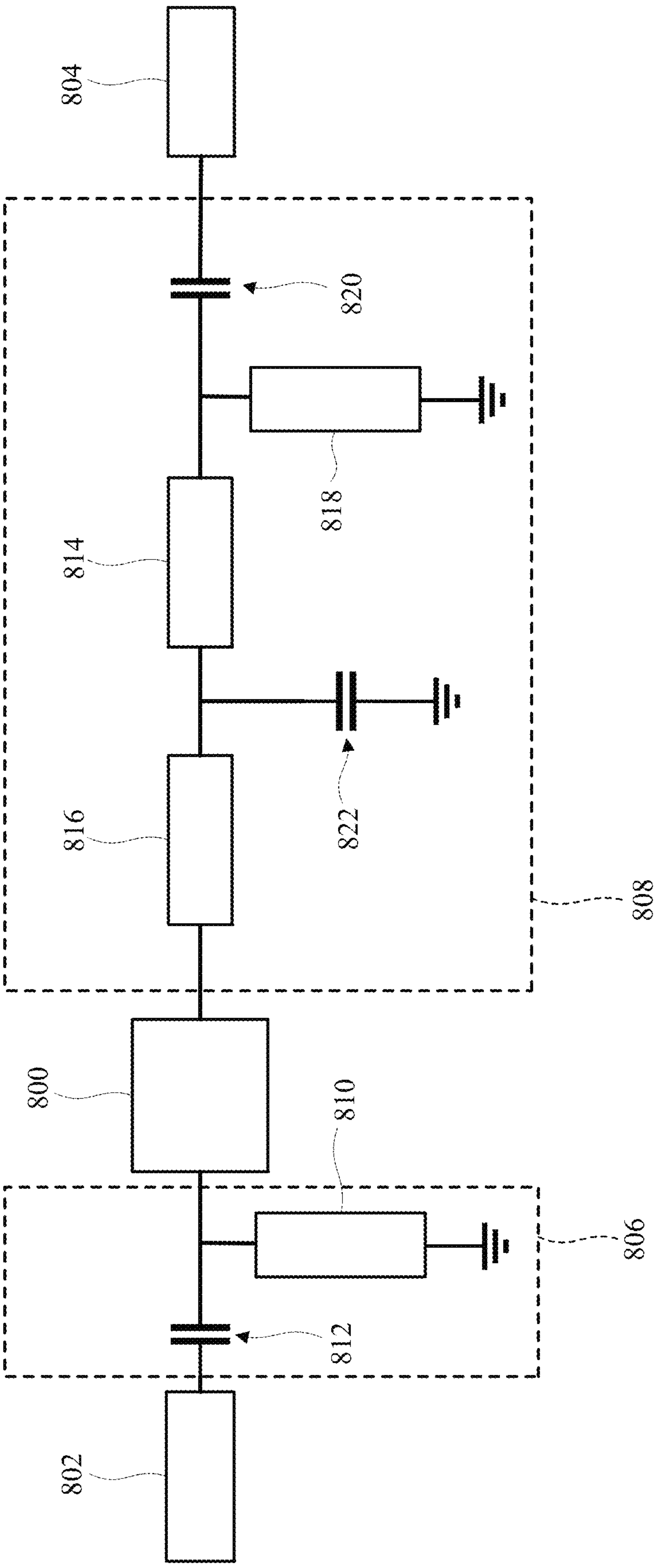
FIG. 8 is a schematic block diagram of an example of an electronic device having two antenna elements and two matching networks.

FIG. 8 is a schematic block diagram of an example of an electronic device 800 (such as, for example, an image capture apparatus) having two antenna elements 802 and 804 and two matching networks 806 and 808. The first antenna element 802 may be, be similar to, include, or be included in, the first antenna element 704 shown in FIGS. 7A and 7B and/or the first antenna element 604 shown in FIGS. 6A-6E; and the second antenna element 804 may be, be similar to, include, or be included in, the second antenna element 710 shown in FIGS. 7A-7C and/or the second antenna element 630 shown in FIGS. 6A-6G. A first matching network 806 is electrically coupled with the first antenna element 802 and a second matching network 808 is electrically coupled with the second antenna element 804.

As shown, the first matching network 806 may include a 2.5 nanohenries (nH) inductor 810 and a 2.7 picofarads (pF) capacitor 812. The second matching network 808 may include a 0.3 nH inductor 814, a 1 nH inductor 816, a 1.1 nH inductor 818, a 2.4 pF capacitor 820 and a 1.1 pF capacitor 822. Any number of other combinations of inductors, capacitors, and/or any other circuit element configured to be used in a matching network may be used in any number of different arrangements to form the first matching network 806 and/or the second matching network 808. The circuit elements and associated arrangements may be selected to optimize a 2×2 dual-band MIMO performance of the first and second antenna elements 802 and 804.

The methods and techniques of the antenna system configured for use with an electronic device having a metal housing described herein, or aspects thereof, may be implemented by an image capture apparatus, or one or more components thereof, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, or the image capture apparatus 500 shown in FIG. 5.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An antenna system configured for use with an electronic device having a housing, the antenna system comprising:

- a first antenna element configured to be disposed at a first location adjacent to a side of the housing, the first antenna element comprising:
  - a first left edge extending along a first body between a first lower end and a first upper end, the first body comprising a first flat portion and a first arcuate portion, and
  - a first right edge extending along the first body between the first lower end and the first upper end, and
  - a first cutout configured to facilitate dual-band radiation associated with the first antenna element defined in the first left edge and extending from a front surface of the first body to a first rear surface of the first body; and
- a second antenna element configured to be disposed at a second location adjacent to the side of the housing, wherein at least a portion of the second antenna element is disposed adjacent to an additional side of the housing, the second antenna element comprising:
  - a second left edge extending along a second body between a second lower end and a second upper end, the second body comprising a second flat portion and a second arcuate portion,
  - a second right edge extending along the second body between the second upper end and a hook feature that protrudes from the second right edge, and
  - a second cutout configured to facilitate dual-band radiation associated with the second antenna element defined in the second arcuate portion and extending from a second front surface of the second body to a second rear surface of the second body,
  - wherein the second cutout comprises a slot extending perpendicularly away from the second upper end toward the second lower end of the second body.

2. The antenna system of claim 1, wherein the first antenna element further comprises:

- a first contact area corresponding to a portion of the first rear surface disposed on a tab defined by the first cutout; and
- a second contact area corresponding to another portion of the first rear surface disposed adjacent to the first cutout.

3. The antenna system of claim 2, wherein the first contact area is configured to be engaged by a first antenna clip and the second contact area is configured to be engaged by a second antenna clip.

4. The antenna system of claim 1, wherein the first antenna element is configured to be electrically coupled with a first matching network, and wherein the second antenna element is configured to be electrically coupled with a second matching network.

5. The antenna system of claim 4, wherein the first matching network and the second matching network are configured to facilitate a dual-band multiple input-multiple output (MIMO) communication capability of the antenna system.

6. The antenna system of claim 4, wherein the second matching network comprises a compact matching network configured in accordance with a form factor.

7. The antenna system of claim 1, wherein the electronic device comprises an image capture apparatus.

8. The antenna system of claim 1, wherein the housing comprises a metal housing.

9. The antenna system of claim 1, wherein the first cutout comprises a notch portion and a slot portion.

10. An electronic device having a metal housing and an antenna system, the antenna system comprising:

- a first antenna element configured to be disposed at a first location adjacent to a side of the metal housing, the first antenna element comprising:
  - a first left edge extending along a first body between a first lower end and a first upper end, the first body comprising a first flat portion and a first arcuate portion, and
  - a first right edge extending along the first body between the first lower end and the first upper end, and
  - a first cutout configured to facilitate dual-band radiation associated with the first antenna element defined in the first left edge and extending from a front surface of the first body to a first rear surface of the first body; and a second antenna element configured to be disposed at a second location adjacent to the side of the metal housing, wherein at least a portion of the second antenna element is disposed adjacent to an additional side of the housing, the second antenna element comprising:

a second left edge extending along a second body between a second lower end and a second upper end, the second body comprising a second flat portion and a second arcuate portion, a second right edge extending along the second body between the second upper end and a hook feature that protrudes from the second right edge, and a second cutout configured to facilitate dual-band radiation associated with the second antenna element defined in the second arcuate portion and extending from a second front surface of the second body to a second rear surface of the second body, wherein the second cutout comprises a slot extending perpendicularly away from the second upper end toward the second lower end of the second body.

11. The electronic device of claim 10, wherein the first antenna element further comprises:

a first contact area corresponding to a portion of the first rear surface disposed on a tab defined by the first cutout; and a second contact area corresponding to another portion of the first rear surface disposed adjacent to the first cutout.

12. The electronic device of claim 11, wherein the first contact area is configured to be engaged by a first antenna clip and the second contact area is configured to be engaged by a second antenna clip.

13. The electronic device of claim 10, wherein the first antenna element is configured to be electrically coupled with a first matching network, and wherein the second antenna element is configured to be electrically coupled with a second matching network.

14. The electronic device of claim 13, wherein the first matching network and the second matching network are configured to facilitate a dual-band multiple input-multiple output (MIMO) communication capability of the antenna system.

15. The electronic device of claim 10, wherein the electronic device comprises an image capture apparatus.

16. The electronic device of claim 10, wherein the first cutout comprises a notch portion and a slot portion.

17. An antenna system for an image capture apparatus having a housing, the antenna system comprising:

a first antenna element configured to be disposed at a first location adjacent to a side of the housing, the first antenna element comprising:

a first left edge extending along a first body between a first lower end and a first upper end, the first body comprising a first flat portion and a first arcuate portion, and a first right edge extending along the first body between the first lower end and the first upper end, and a first cutout configured to facilitate dual-band radiation associated with the first antenna element defined in the first left edge and extending from a front surface of the first body to a first rear surface of the first body; and a second antenna element configured to be disposed at a second location adjacent to the side of the housing, wherein at least a portion of the second antenna element is disposed adjacent to an additional side of the housing, the second antenna element comprising:

a second left edge extending along a second body between a second lower end and a second upper end, the second body comprising a second flat portion and a second arcuate portion, a second right edge extending along the second body between the second upper end and a hook feature that protrudes from the second right edge, and a second cutout configured to facilitate dual-band radiation associated with the second antenna element defined in the second arcuate portion and extending from a second front surface of the second body to a second rear surface of the second body, wherein the second cutout comprises a slot extending perpendicularly away from the second upper end toward the second lower end of the second body.

18. The antenna system of claim 17, wherein the first antenna element further comprises:

a first contact area corresponding to a portion of the first rear surface disposed on a tab defined by the first cutout; and a second contact area corresponding to another portion of the first rear surface disposed adjacent to the first cutout.

19. The antenna system of claim 17, wherein the first antenna element is configured to be electrically coupled with a first matching network, and wherein the second antenna element is configured to be electrically coupled with a second matching network, wherein the first matching network and the second matching network are configured to facilitate a dual-band multiple input-multiple output (MIMO) communication capability of the antenna system.

20. The antenna system of claim 17, wherein the housing comprises a metal housing.

* * * * *